United States Patent
Garg et al.

(10) Patent No.: US 6,397,236 B1
(45) Date of Patent: May 28, 2002

(54) HYBRID TECHNIQUE FOR PERFORMING A COLUMN MODIFICATION OPERATION IN A SPARSE SYMMETRIC DIRECT MATRIX SOLVER

(75) Inventors: Rajat P. Garg, Mountain View; Partha P. Tirumalai, Fremont, both of CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/316,168

(22) Filed: May 21, 1999

(51) Int. Cl.$^7$ ............................................. G06F 7/38
(52) U.S. Cl. ................................. 708/446; 708/520
(58) Field of Search ................................. 708/446, 520

(56) References Cited

U.S. PATENT DOCUMENTS

| | | | | |
|---|---|---|---|---|
| 5,200,915 A | * | 4/1993 | Hayami et al. | 708/520 |
| 5,206,822 A | * | 4/1993 | Taylor | 708/607 |
| 5,392,429 A | * | 2/1995 | Agrawal et al. | 708/446 |
| 5,548,798 A | * | 8/1996 | King | 710/68 |
| 5,717,621 A | * | 2/1998 | Gupta et al. | 708/446 |
| 5,864,786 A | * | 1/1999 | Jericevic | 702/189 |

OTHER PUBLICATIONS

Heath, et al.; "Parallel Algorithms for Sparse Linear Systems"; Parallel Algorithms for Matrix Computations; Society for Industrial and Applied Mathematics by Gallivan, et al; Copyright 1990; pp. 83–124.

* cited by examiner

Primary Examiner—Chuong Dinh Ngo
(74) Attorney, Agent, or Firm—Park, Vaughan & Fleming LLP

(57) ABSTRACT

A hybrid system for efficiently performing a cmod operation in solving a system of linear algebraic equations involving a sparse coefficient matrix. The system operates by identifying supernodes in the sparse matrix, wherein each supernode comprises a set of contiguous columns having a substantially similar pattern of non-zero elements. In solving the equation, the system performs a column modification (CMOD) operation between a source supernode and a destination supernode. As part of this CMOD operation, the system determines dimensions of the source supernode and the destination supernode. If a result of a function on the dimensions is lower than a threshold value, the system performs the CMOD operation between the source supernode and the destination supernode using a kernel that is written in an architecture-independent high-level language. If the result of the function on the dimensions is greater than the threshold value, the system performs the CMOD operation using a kernel that is written in an architecture-specific assembly code that runs efficiently on a specific computer architecture.

21 Claims, 4 Drawing Sheets

HYBRID TECHNIQUE FOR PERFORMING A COLUMN MODIFICATION OPERATION IN A SPARSE SYMMETRIC DIRECT MATRIX SOLVER

RELATED APPLICATIONS

The subject matter of this application is related to the subject matter in a co-pending non-provisional application by the same inventor(s) as the instant application and filed on the same day as the instant application entitled, "Using Tiling to Improve Performance in a Sparse Symmetric Direct Matrix Solver," having serial number 09/316,173, and filing date May 21, 1999.

BACKGROUND

1. Field of the Invention

The present invention relates to computer systems for performing sparse matrix computations. More particularly, the present invention relates to a method and an apparatus that uses a hybrid approach to efficiently perform a column modification (CMOD) operation in solving a system of linear algebraic equations involving a sparse coefficient matrix.

2. Related Art

The solution of large sparse symmetric linear systems of equations constitutes the primary computational cost in numerous applications, such as finite-element design, linear programming, circuit simulation and semiconductor device modeling. Efficient solution of such systems has long been the subject of research, and considerable progress has been made in developing efficient algorithms to this end. A direct solution technique known as "Cholesky Factorization" is the most widely used approach to solve such a system. Under Cholesky factorization, the complete solution sequence requires many stages, including matrix reordering, symbolic factorization, numerical factorization and triangular solution. Of these stages, numerical factorization is typically the most computationally expensive.

One method of performing numerical factorization is based on a right-looking supernode-supernode method described in "Parallel Algorithms for Sparse Linear Systems" by Michael T. Heath, Esmond Ng and Barry W. Peyton, in "Parallel Algorithms for Matrix Computations" by Gallivan, et al. (Editors), SIAM (1994) (referred to as HNP). In a sparse matrix, a supernode is a set of contiguous columns that have essentially the same sparsity structure. Supernodes can be used to organize the numerical factorization stage around matrix-vector (supernode-column) and matrix-matrix (supernode-supernode) primitive operations leading to a substantial performance improvement arising from more efficient use of the processor caches and pipelining units.

The numerical factorization step involves two fundamental sub-tasks:

(1) cdiv(j): division of column j of factor by a scalar; and
(2) cmod(j,k): modification of column j by column k, k<j.

These sub-tasks can be organized around supernodes. For example, cdiv(j) can be organized as an internal factorization/update of supernode j, and cmod(j,k) can be organized as a modification of supernode j by supernode k, k<j.

Typically, the second sub-task is where the bulk of the computational cost is incurred. In order to increase computational efficiency, the cmod(j,k) operation can be divided into three steps:

(a) computation of the update and accumulation into a temporary array;
(b) carrying out the non-zero index matching between the first columns of the source and destination supernodes and computing relative indices; and
(c) scattering updates from the temporary vector into the target destination supernode.

By dividing the cmod(j,k) operation in this way, it is possible to apply techniques used in dense matrix operations in the step (a). Note that step (a) is where the dominant amount of time is spent. In the discussion that follows, we refer the step (a) as the "local dense cmod operation". The local dense cmod operation involves computing a trapezoidal-shaped dense update that can be represented as a combination of a dense rank-k update and a matrix multiplication.

Library routines can be used to speed up the cmod computation. These library routines are typically written in assembly language and are hand-tuned for a specific machine architecture. For example, on the current generation of UltraSparc-II-based machines, the Sun Performance Library (see http://www.sun.com/workshop/performance/wp-perflib/) provides SPARC assembly-language implementations of BLAS1, BLAS2 and BLAS3 routines. These hand-tuned assembly language implementations can yield performance close to the theoretical peak of the underlying processor.

For example, portions of the cmod operation can be efficiently performed by invoking the BLAS3 "dgemm" matrix multiplication code from Sun Performance library. Unfortunately, invoking the BLAS3 dgemm matrix multiplication code requires supernodes to be copied into and out of temporary storage because of incompatibility between data-structures used by a typical sparse solver and those expected by the dgemm API. This copying can add a significant overhead. Consequently, using the BLAS3 "dgemm" matrix multiplication code only makes sense for supernodes above a certain size. Otherwise, the performance gains from using the BLAS3 "dgemm" library code are cancelled out by the additional overhead involved in copying.

Hence, what is needed is a system that performs the cmod operation using library routines in cases where the performance gains from using the library routines exceed the computational overhead required to use the library routines.

Another difficulty in attaining high performance in numerical factorization is due to the fact that supernodes can have varying shapes, sizes, and sparsity patterns. These varying shapes, sizes and sparsity patterns can greatly influence computational performance. In order to optimize computational performance for the cmod operation, the supernodes of varying shapes and sizes must be divided into smaller sub-units for computation so as to balance computational operations with memory references in a way that is tuned for the particular machine architecture on which the computation is to be run.

SUMMARY

One embodiment of the present invention provides a system for efficiently perform a cmod operation in solving a system of linear algebraic equations involving a sparse coefficient matrix. The system operates by identifying supernodes in the sparse matrix, wherein each supernode comprises a set of contiguous columns having a substantially similar pattern of non-zero elements. In solving the equation, the system performs a CMOD operation between a source supernode and a destination supernode. As part of this CMOD operation, the system determines dimensions of the source supernode and the destination supernode. If a result of a function on the dimensions is lower than a threshold value, the system performs the CMOD operation between the source supernode and the destination supernode using a kernel that is written in an architecture-independent high-level language. If the result of the function on the dimensions is greater than the threshold value, the system performs the CMOD operation using a kernel that is written in an architecture-specific assembly code that runs efficiently on a specific computer architecture. Using this architecture-specific assembly code may require first copying supernodes into temporary data structures that are tailored for the assembly code.

In one embodiment of the present invention, the result of the function on the dimensions is lower than the threshold value if the number of columns of the source supernode is less than a first threshold value, the number of columns of the destination supernode is less than a second threshold value, and the number of common contiguous elements in columns to be updated in the destination supernode is less than a third threshold value. These threshold values can be empirically pre-computed using representative problem instances.

Thus, the present invention automates the selection of the appropriate kernel to maximize the overall performance of the cmod operation independently of the problem structure and size.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a carrier wave. For example, the carrier wave may carry information across a communications network, such as the Internet.

Computer System

Figure 1:
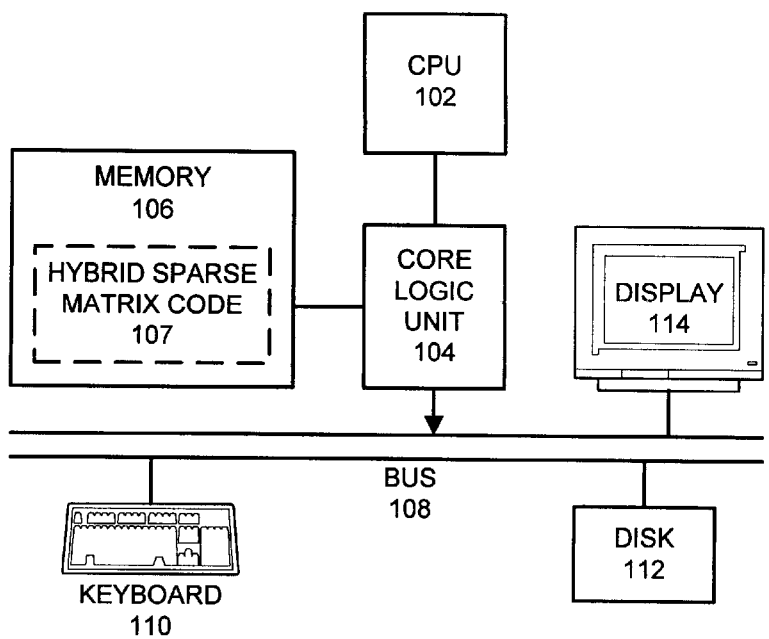
FIG. 1 illustrates a computer system in accordance with an embodiment of the present invention.

FIG. 1 illustrates a computer system in accordance with an embodiment of the present invention. The computer system illustrated in FIG. 1 includes central processing unit (CPU) 102, core logic unit 104, memory 106, bus 108, display 114, keyboard 110 and disk 112. More specifically, core logic unit 104 couples CPU 102 with memory 106. CPU 102 may include any type of computational engine for executing programs within the computer system. This includes, but is not limited to, a microprocessor, a device controller and a computational device within an appliance. Memory 106 may include any type of random access memory for storing code and data for use by CPU 102. As illustrated in FIG. 1, memory 106 includes hybrid sparse matrix code 107. Core logic unit 104 includes circuitry for interconnecting various computer system components, including CPU 102, memory 106 and bus 108.

Bus 108 couples core logic unit 104 with display 114, keyboard 110 and disk 112. Bus 108 may include any type of communication channel for coupling core logic unit 104 with peripheral devices, such as display 114, keyboard 110 and disk 112. Display 114 may include any type of device for displaying images from a computer system. Disk 112 may include any type of non-volatile storage device for storing code and data to for use by CPU 102. This includes, but is not limited to, magnetic storage devices, such as a disk drive, and electronic storage devices, such as flash memory or battery backed up RAM. Keyboard 110 may include any type of device for inputting data into the computing system. This includes input devices such as a keyboard and a mouse.

Note that although a specific computer system architecture is illustrated in FIG. 1, the present invention may be used with any computational device that can execute a computer program, including a microprocessor system, a mainframe computer system, a device controller and a computing device in an appliance.

Cholesky Factorization

Figure 2:
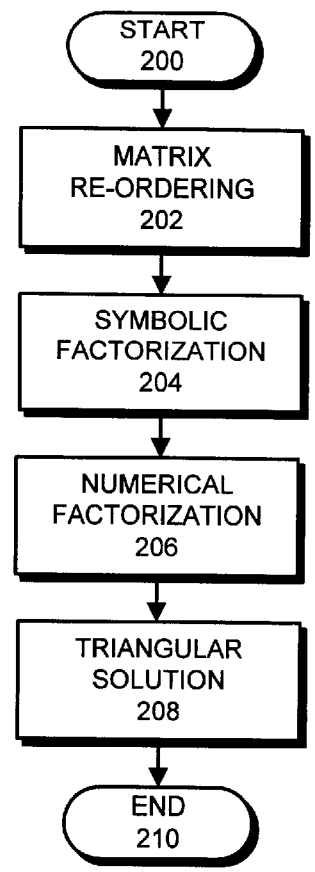
FIG. 2 illustrates the major stages involved solving a sparse symmetric linear system of equations in accordance with an embodiment of the present invention.

FIG. 2 illustrates the major stages involved solving a sparse symmetric linear systems of equations in accordance with an embodiment of the present invention. The system starts an equation of the form Ax=b, "where A is an n×n sparse matrix that is both symmetric and positive-definite, b is a known vector and x is the unknown solution vector to be computed. One way to solve the linear system is to first compute the Cholesky factorization $A=LL^T$, where the Cholesky factor L is a lower triangular matrix with positive definite diagonal elements. Then the solution vector x can be computed by successive forward and back substitutions to solve the triangular systems Ly=b and $L^Tx=y$." (see page 84 of HNP above)

As mentioned above, the Cholesky factorization approach involves a number of stages, including matrix reordering (step 202), symbolic factorization (step 204), numerical factorization (step 206) and triangular solution (step 208). The matrix reordering step 202 involves shuffling around the rows and columns of the sparse matrix so that "fill in" gets reduced. During numerical factorization, "fill in" increases the number of non-zero elements in the sparse matrix and hence reduces computational performance.

The symbolic factorization step 204 determines which entries will become non-zero values and identifies supernodes. As mentioned above, a supernode is a set of contiguous columns that have essentially the same sparsity structure. Supernodes can be used to organize the numerical factorization stage around matrix-vector (supernode-column) and matrix-matrix (supernode-supernode) primitive operations leading to a substantial performance improvement arising from more efficient use of the caches and pipelining units. The symbolic factorization step 204 also involves allocating memory needed to solve the sparse matrix.

Next, the numerical factorization step 206 is performed using Gaussian elimination (or some equivalent solution technique) on the sparse matrix. Note that this generally requires $O(n^3)$ time for an n×n dense matrix.

Finally, the triangular solution step 208 solves the remaining triangular system of equations.

Of the four above-listed steps, the numerical factorization step 206 consumes most of the computational time.

Figure 3:
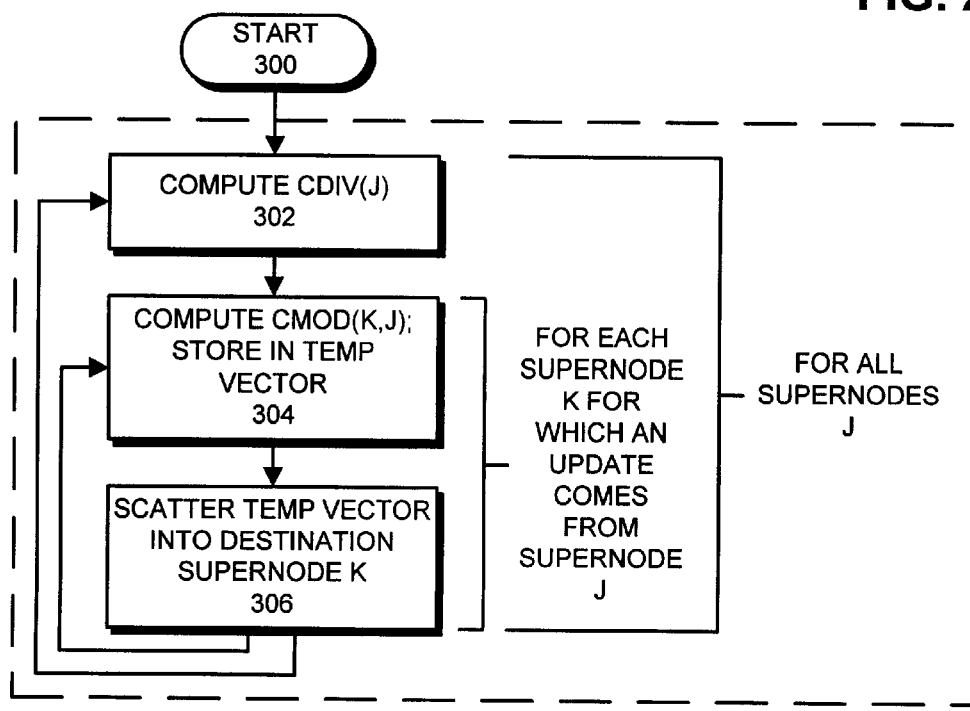
FIG. 3 illustrates some of the steps involved in numerical factorization in accordance with an embodiment of the present invention.

FIG. 3 illustrates some of the steps involved in numerical factorization in accordance with an embodiment of the present invention. As mentioned above, the numerical factorization step 206 involves two fundamental sub-tasks:

(1) cdiv(j): division of column j of factor by a scalar; and
(2) cmod(j,k): modification of column j by column k, k<j.

These sub-tasks can be organized around supernodes. For example, cdiv(j) can be organized as an internal factorization/update of supernode j, and cmod(j,k) can be organized as a modification of supernode j by supernode k, k<j. More specifically, computing cdiv(j) for a matrix L involves computing for(i=j to n) $\{L_{ij}=L_{ij}/L_{jj}\}$. Similarly, computing cmod(k,j) involves computing for(i=j to n) $\{L_{ik}=L_{ik}-L_{jk}*L_{ij}*L_{jj}\}$.

The computation illustrated in FIG. 3 is includes an outer loop and an inner loop. The outer loop is executed for all source supernodes j. In this outer loop, cdiv(j) is computed (step 302). Next, the inner loop takes place for each supernode k for which an update comes from supernode j. Within this inner loop, the system computes cmod(k,j) and stores the result in a temporary vector (step 304). This temporary vector is eventually scattered into destination supernode k (step 306).

Figure 4:
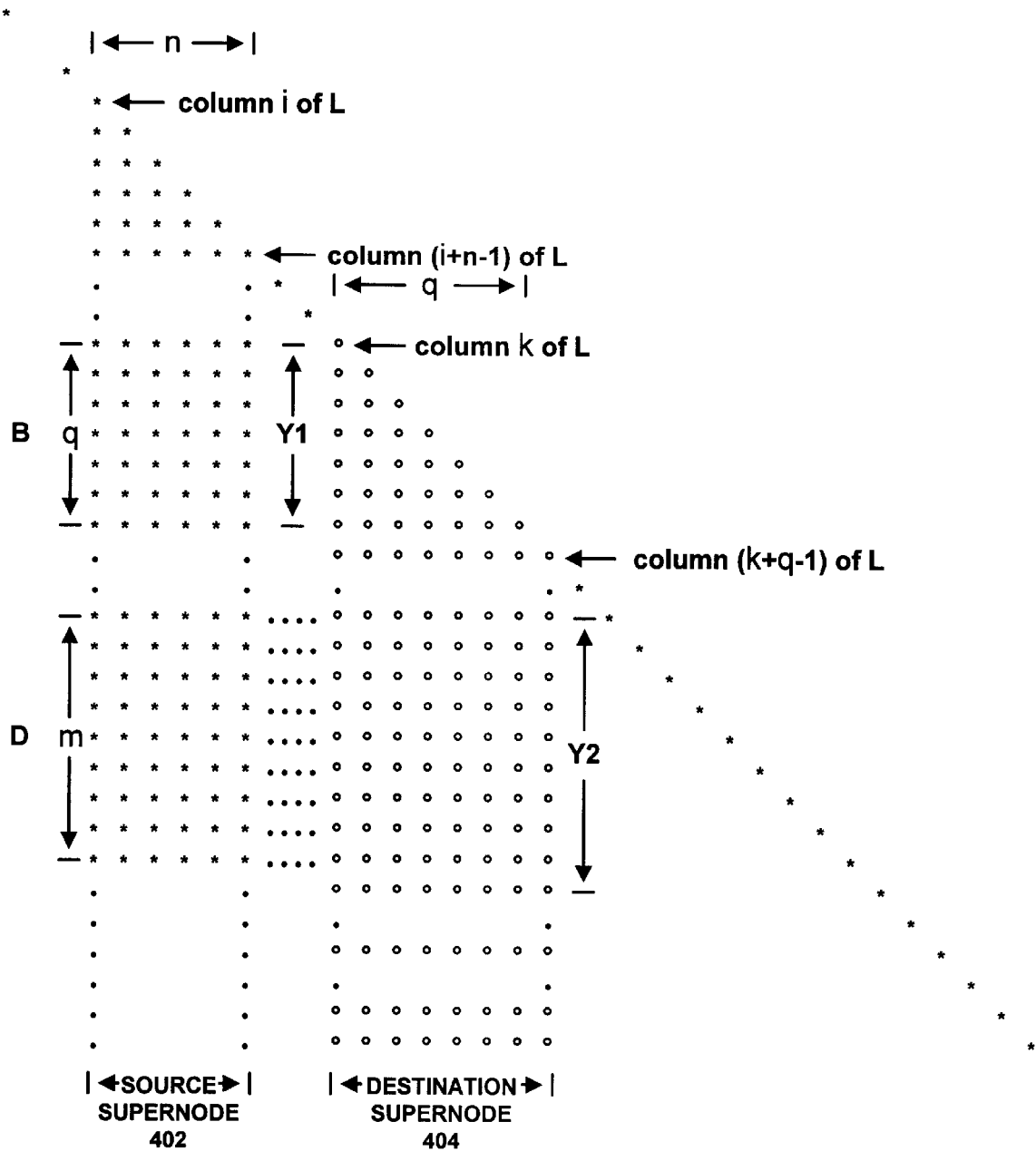
FIG. 4 illustrates the supernode structure of a sparse matrix in accordance with an embodiment of the present invention.

FIG. 4 illustrates the supernode structure of a sparse matrix in accordance with an embodiment of the present invention. FIG. 4 illustrates a sparse matrix with two supernodes, source supernode 402 and destination supernode 404. Note the similarity of the sparsity pattern in the columns comprising each supernode. Also note how supernodes provide dense sub-blocks which allow application of dense-matrix operations in numerical factorization step 206. In the embodiment illustrated in FIG. 4, sub-blocks in both source supernode 402 and destination supernode 404 occur in contiguous rows of the matrix. Note that in general these supernodes can be interspersed with rows containing zeroes. This does not affect the calculation of "local dense cmod" because a compact data-structure is used to store the non-zeroes of matrix L. It should be noted that the non-zero structure of destination supernode 404 is necessarily a superset of the non-zero structure of source supernode 402 below row k. The actual non-zero structures of columns i and k are relevant only in the stage where the update from source supernode 402 is scattered into the destination supernode 404. The "local dense cmod" operation computes the update from source supernode 402 into a portion of the destination supernode 404 as described below.

In FIG. 4, "n" is the number of columns in source supernode 402, "q" is the number of columns updated in the destination supernode 404, and "m" is the common length of update for all updated columns of destination supernode 404.

Also, note from FIG. 4 that B is rectangular sub-block of size q rows and n columns; D is a rectangular sub-block of size m rows and n columns; Y1 is a lower-triangular sub-block of size q rows by q columns; and Y2 is a rectangular sub-block of size m rows by q columns.

The update Y is trapezoidal and can be represented as:

$$Y = \begin{vmatrix} Y1 \\ Y2 \end{vmatrix},$$

wherein $Y1=Y1-BB^T$ (rank-n update), and $Y2=Y2-DB^T$ (matrix-multiplication). Thus, the computation of the update can be expressed in terms of matrix library routines.

In the compact storage, the non-zeroes of the factor L are stored column-by-column. Thus, one embodiment of the present invention is represented in C programming language below. Note that in the actual implementation the structure for storing the sparse matrix is more complicated and additional fields are needed to carry the integer row-index information. Only the portion relevant to the local dense cmod operation is presented below.

Assume that the number of rows in the matrix=nrows

```
struct {
    int *lcollen;   /* array of length nrows */
    int *supernode; /* array of length nrows with supernode info. */
    double **nz;    /* 2D array representing the factor L */
} L;
```

Here,

L.lcollen[i]: length of column i, i=0 . . . (nrows−1)

L.nz[i][j]: j-th entry of i-th column if L.supernode[i]>0==>it is width of supernode starting at i;

if L.supernode[i]<0 ==>i th col is in supernode starting at i+L.supernode[i]

Note that L.nz[i][0]. . . L.nz[i][L.lcollen[i]−1] are non-zeroes in the i-th column. For a given supernode, the columns have following relationship:

L.lcollen[1]=L.lcollenz[1−1]−1; 1=(i+1) . . . (i+n−1).

As one can see, the difficulty in using library routines comes from the trapezoidal nature of supernodes. For example, the dgemm API expects the columns of B and D to be stored contiguously, whereas the sparse storage also carried the apex triangle in the supernode.

The (sequential) right-looking supernode-supernode pseudo-algorithm operates as follows:

```
let nsup = the number of supernodes in the matrix
for j=1....nsup {
    compute cdiv(j)
    for each k such that L_kj !=0 (k > j) {
        compute number of columns of supernode k modified by
        supernode j
        stor = cmod(k,j) (stor is temporary storage)
        scatter stor into columns of destination supernode k
    }
}
```

One embodiment of the present invention proceeds as follows. (1) In a pre-processing step, the supernodes are split into vertical panels that fit into the L2-cache. The blocking factors are determined based on the size of L2 cache at run-time and are such that the panels can be at most 0.5*Sizeof(L2 Cache). (2) In the right-looking factorization, first the internal update/factorization of the source supernode 402 takes place. This loads all the columns of source supernode 402 into the L2-cache. (3) Next, a loop is started that computes the sequence of updates from source supernode 402 into various destination supernodes 404. Each of these calculations involves performing a local dense cmod operation. One of the advantages of using steps (1) and (2) is that with proper care, one can ensure that source supernode 402 stays in the L2 cache so that data is reused, which increases cache hit rates.

Hybrid CMOD Operation

```
for the current source supernode being processed {
    while (there are updates left to be computed) {
        identify the destination supernode and find m, q for the update
        if (m-q < MCUT && q < QCUT && n < NCUT) {
            initialize temporary storage for Y
            Use C-based kernels to compute the update Y
        }
        else {
            initialize temp storage for Y1
            compute Y1 using C-based kernels
            copy-in B and D into temporary storage
            invoke dgemm to compute Y2 (dgemm
            automatically initializes Y2 storage)
        }
    } end while
} end processing of source supernode
```

Here MCUT, NCUT and QCUT are empirically determined after extensive testing using a representative sample of sparse matrix equations. In one embodiment of the present invention, the empirically predetermined values are MCUT=28, NCUT=32 and QCUT=16. Note that the scatter kernels have also been tailored separately for the two cases, so that no copy-out is required in case of a library routine call.

Note that the maximum possible size of temporary storage is less than half of L2 cache-size since the supernodes are split into panels restricted to be less than 0.5*sizeof(L2 cache).

Figure 5:
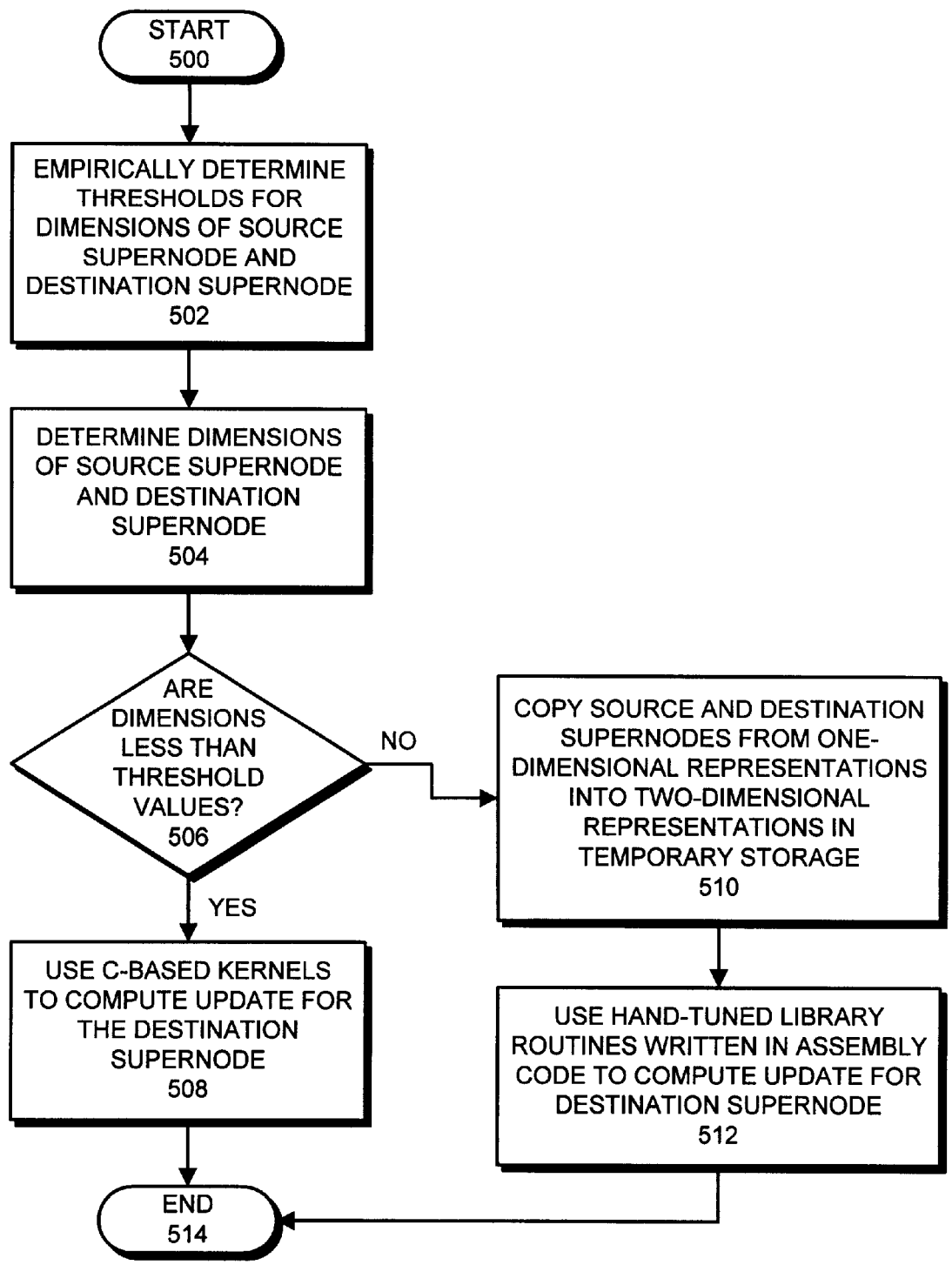
FIG. 5 is a flow chart illustrating a hybrid technique for performing the CMOD operation in accordance with an embodiment of the present invention.

FIG. 5 is a flow chart illustrating a hybrid technique for performing the CMOD operation in accordance with an embodiment of the present invention. This hybrid technique first empirically determines threshold values for dimensions of the source supernode 402 and destination supernode 404 (step 502). These threshold values are used to determine whether to use C-based kernels or assembly language-based kernels to perform the cmod operation. Recall that using the assembly language kernels introduces copying overhead cannot be justified for smaller supernodes.

Note that threshold values MCUT, NCUT and QCUT can be predetermined by performing test cmod operations on representative sparse matrices before the actual cmod operation takes place. These predetermined values can be stored in a table or some other type of data structure.

Next, the system determines the dimensions of source supernode 402 and destination supernode 404 (step 504). Then the system asks whether the dimensions are less than threshold values MCUT, NCUT and QCUT (step 506). In one embodiment of the present invention, the system determines if all of the dimensions are less than their corresponding threshold values. In another embodiment, the system determines if one of the dimensions is lower than a corresponding threshold value. In general, the system can perform a function on the dimensions to produce a result that is compared with a threshold value.

If the dimensions are less than the threshold values, the supernode dimensions are too small to take advantage of the system library routines because of the copying overhead involved in using the library routines. In this case, the system uses kernels written in a high-level language, such as C, to compute an update for destination supernode 404 (step 508).

If the dimensions are not less than the threshold values, the system copies the supernodes from a compacted one-dimensional representation into a two-dimensional representation that is suitable for the system library routines (step 510). Next, the system uses the hand-tuned system library routines written in assembly language to compute updates for destination supernodes (step 512).

Thus, the present invention automates the selection of the appropriate kernel to substantially optimize performance of the CMOD operation independently of problem structure and problem size.

Tiling Process

Figure 6:
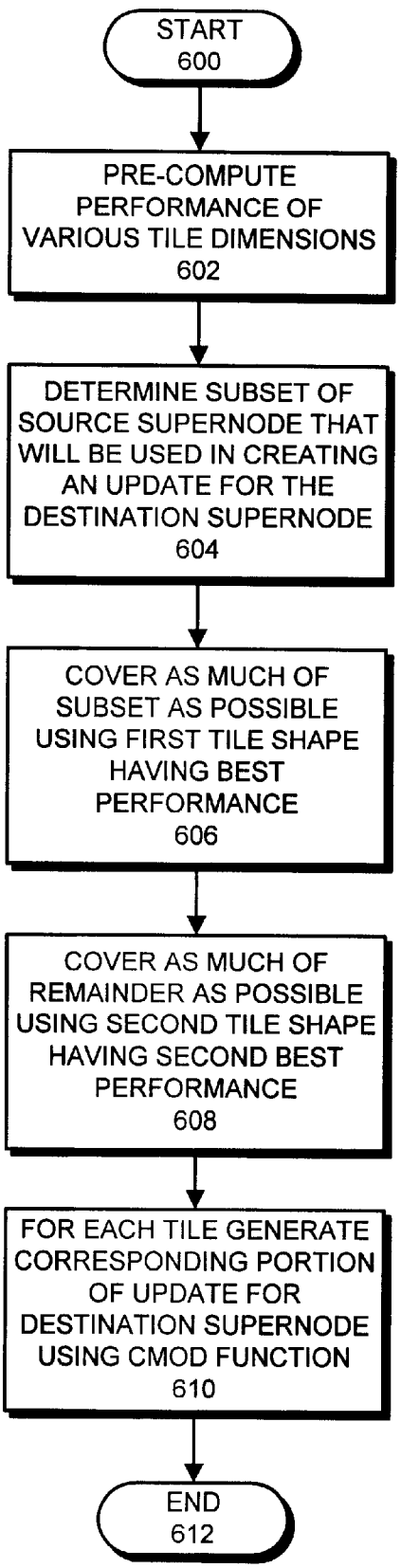
FIG. 6 is a flow chart illustrating the process of using tiling during the CMOD operation in accordance with an embodiment of the present invention.

FIG. 6 is a flow chart illustrating the process of tiling during execution of the C-based kernels for the CMOD operation in accordance with an embodiment of the present invention. The system first pre-computes the performance of various tile dimensions (step 602). Next, the system determines a subset of source supernode 402 that will be used to create an update for destination supernode 404 (step 604). Next, the system covers as much of the subset of source supernode 402 as is possible using the tile shape with the best performance (step 606). If there is a remainder after using the best tile shape, the system covers as much of the remainder as possible using a second best tile shape having a second best performance (step 608). Next, for each tile the system generates a corresponding portion of an update for destination supernode 404 by performing a local dense cmod operation (step 610).

Note that the above embodiment can be extended to include additional tile shapes beyond the best tile shape and the second best tile shape. Also note that in general any possible optimization algorithm can be used to match tile shapes with supernode dimensions. In fact, the tiling problem reduces to a variant of a well-known NP-complete problem known as "two-dimensional bin packing" for which many heuristic solutions have been developed.

One embodiment of the tiling process is described in more detail as follows. In the C-based kernels, both components of the update (Y1 and Y2) are calculated simultaneously. Pseudo-code for the doubly-tiled triple loop appears below.

```
for kk = 1....q,qtile
    {set up pointers for temporary storage}
    for jj = 1.....n, ntile
        {compute the triangle qtile*qtile of update}
        for ii = 1.....m+q
            {compute qtile*ntile elements of update}
        endfor
    endfor
endfor
```

For the case of a 4×3 tile in which ntile=4 and qtile=3, the innermost loop can be implemented as follows.

```
for (ileft=thisFirst2 + 1; ileft<L.lcollen[col];ileft++){
    d0 = dest0[jright]; dl = dest1[jright-1]; d2 = dest2[jright-2];
    tmp0 = L.nz[col][ileft];   d0 -= ljk0__0*tmp0; d1 -= ljk0__1*tmp0;
        d2 -= ljk0__2*tmp0;
    tmp1 = L.nz[coll][ileft-1]; d0 -= ljk1__0*tmp1; d1 -= ljk1__1*tmp1;
        d2 -= ljk1__2*tmp1;
    tmp0 = L.nz[col2][ileft-2]; d0 -= ljk2__0*tmp0; d1 -= ljk2__1*tmp0;
        d2 -= ljk2__2*tmp0;
    tmp1 = L.nz[col3][ileft-3]; d0 -= ljk3__0*tmp1; d1 -= ljk3__1*tmp1;
        d2 -= ljk3__2*tmp1;
    dest0[jright] = d0; dest1[jright-1] = d1; dest2[jright-2] = d2;
    jright++;
}
```

Note that this implementation attempts to do grouping and delayed writes to in order to give hints to the compiler during the code-generation process.

Also note that by unrolling the outer loops, this embodiment significantly increases both the temporal and spatial locality in the calculations. Furthermore, the compiler is used for pipelining the innermost loop with instructions scheduled for the L2 cache.

TABLE 1

| Tiles (ntile*qtile) | FP-Ops | Mem-Ops | R = FP-Ops/Mem-ops |
|---|---|---|---|
| 1 × 1 | 1 | 3 | 0.33 |
| 1 × 2 | 2 | 5 | 0.40 |
| 1 × 3 | 3 | 7 | 0.43 |
| 1 × 4 | 4 | 9 | 0.44 |
| 1 × 6 | 6 | 13 | 0.46 |
| 2 × 1 | 2 | 4 | 0.5 |
| 2 × 3 | 6 | 8 | 0.75 |
| 3 × 3 | 9 | 9 | 1.0 |
| 3 × 4 | 12 | 11 | 1.09 |
| 4 × 1 | 4 | 6 | 0.67 |
| 4 × 2 | 8 | 8 | 1.0 |
| 4 × 3 | 12 | 10 | 1.2 |
| 4 × 4 | 16 | 12 | 1.33 |
| 6 × 1 | 6 | 8 | 0.75 |
| 6 × 2 | 12 | 10 | 1.2 |
| 8 × 1 | 8 | 10 | 0.80 |
| 8 × 2 | 16 | 12 | 1.33 |

Table 1 presents performance characteristics for tiling combinations that were empirically tested on an UltraSparc-II based system, which has 32 floating point registers (see). Table 1 also lists the number of floating point operations (FP-Ops) and memory operations (Mem-Ops) for each of the tilings. The FP-Ops are counted by considering floating point addition and multiply operations to be one operation. Memory operations include both the load and store operations; no distinction is made between the two.

The performance of a tiling depends on the value of R=FP-Ops/Mem-ops and the number of floating-point registers available on the microprocessor. During extensive testing on representative sparse matrix test problems, it was determined that a 4×4 tiling has a higher R than 4×3. However, on the UltraSparc-II systems the latter performs better due to lower register-pressure which allows tighter code scheduling.

Once good tile shapes are identified, these tile shapes are applied to specific supernode dimensions. For example, one embodiment of the present invention operates as follows. Assume that qmod=q%3; nmod=n%4; and nc=n/4. (Recall that n is the number of columns in source supernode 402, and q is the number of columns to be updated in destination supernode 404.) The primary computation is done using 4×3 tiling. Next, if qmod equals 1, a 6×1 tiling is used, and if qmod equals 2 a 6×2 tiling is used. Next, if nmod equals 3 the system covers 4*nc columns with 4×3 tiles and 3 columns with 3×3 tiles; if nmod equals 2 the system covers 4*(nc−1) columns with 4×3 tiles and 6 columns with 3×3 tiles; and if nmod equals 1 the system covers 4*(nc−1) columns with 4×3 tiles, 3 columns with 3×3 tiles, and 2 columns with 2×3 tiles (This avoids a 1×3 remainder column that has quite poor computational performance). Note that these tilings have been optimized for an UltraSparc-II processor with 32 floating point registers and an L2 cache latency of ~8–10 cycles. Similar tilings can be developed for different numbers of floating point registers and different cache latencies.

Pseudo-code for the triple loop trapezoidal update appears below. Assume that m and q have been computed already.

```
nmod = n%4
nleft = 3
if (nmod=1 or nmod=2) nleft=7
qmod = q%3
if (qmod=1)
    {use 6×1 tiling to compute the update}
else if (qmod=2)
    {use 6×2 tiling to compute the update}
{move pointers in the temporary storage}
for (k=qmod; k<q; k+=3) {
    {move set-up pointers to three temporary storage vectors for
        storing updates to the three destination columns}
            /* first run 4×3 tiling */
    for (j=0; j<n-nleft; j+=4) {
        {set-up the 12-consants in the innermost loop}
        {calculate the 3×3 triangular portion at the apex of the three
            destination columns separately}
        {compute istart value for innermost loop}
        {run the innermost loop for the 4×3 tile}
    }
            /* now run 3×3 tiling */
    for (;j<n; j+=3) {compute using the 3×3 tiling}
            /* now run 2×3 tiling */
    for (;j<n; j+=2) {compute using the 2×3 tiling}
}
```

Note this approach has minimal overhead. Also note that by setting the variable nleft we can easily select a combination of different tilings. For example, in the case where (nmod equals 1) nleft equals 11 and the system computes 4*(nc−2) columns using 4×3 tilings and 9 columns using 3×3 tilings.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

What is claimed is:

1. A method for efficiently solving a system of equations involving a sparse matrix, comprising:
   receiving the sparse matrix as part of an equation to solve;
   identifying a plurality of supernodes in the sparse matrix, each supernode comprising a set of contiguous columns having a substantially similar pattern of non-zero elements; and
   performing a column modification (CMOD) operation between a source supernode and a destination supernode from the plurality of supernodes by,
      determining dimensions of the source supernode and the destination supernode,
      performing the CMOD operation between the source supernode and the destination supernode using code that is written in an architecture-independent high-level language if a result of a function on the dimensions is lower than a threshold value, and
      performing the CMOD operation between the source supernode and the destination supernode using code that is written in an architecture-specific assembly code to run efficiently on a specific computer architecture if the result of the function on the dimensions is greater than the threshold value.

2. The method of claim 1, further comprising performing a column division (CDIV) operation on the plurality of supernodes prior to performing the CMOD operation, the CDIV operation dividing each element in each column by a scalar value.

3. The method of claim 1, wherein performing the CMOD operation using the code that is written in the architecture-specific assembly code further comprises copying the source supernode into a first data structure and copying the destination supernode into a second data structure.

4. The method of claim 3, wherein copying the source supernode into the first data structure includes copying the source supernode from a one-dimensional data structure into a two-dimensional data structure.

5. The method of claim 1, wherein the dimensions of the source supernode and the destination supernode include:
   a number of columns of the source supernode;
   a number of columns of the destination supernode; and
   a number of common contiguous elements in columns to be updated in the destination supernode.

6. The method of claim 5, wherein the result of the function on the dimensions is lower than the threshold value if,
   the number of columns of the source supernode is less than a first threshold value,
   the number of columns of the destination supernode is less than a second threshold value, and
   the number of common contiguous elements in columns to be updated in the destination supernode is less than a third threshold value.

7. The method of claim 6, further comprising empirically determining the first threshold value, the second threshold value and the third threshold value.

8. The method of claim 5, wherein the result of the function on the dimensions is lower than the threshold value if,
   the number of columns of the source supernode is less than a first threshold value, or
   the number of columns of the destination supernode is less than a second threshold value, or
   the number of common contiguous elements in columns to be updated in the destination supernode is less than a third threshold value.

9. The method of claim 1, wherein the architecture-specific assembly code comes from a system library.

10. The method of claim 1, further comprising performing the CMOD operation between the source supernode and the destination supernode using code that is written in the architecture-specific assembly code if the result of the function on the dimensions is equal to the threshold value.

11. The method of claim 1, wherein performing the CMOD operation further comprises:
    storing a result of the CMOD operation in a temporary vector; and
    scattering a contents of the temporary vector into a destination representation of the sparse matrix.

12. A method for efficiently solving a system of equations involving a sparse matrix, comprising:
    receiving the sparse matrix as part of an equation to solve;
    identifying a plurality of supernodes in the sparse matrix, each supernode comprising a set of contiguous columns having a substantially similar pattern of non-zero elements;
    performing a column division (CDIV) operation on the plurality of supernodes, the CDIV operation dividing each element in each column by a scalar value,
    performing a column modification (CMOD) operation between a source supernode and a destination supernode from the plurality of supernodes by,
       determining dimensions of the source supernode and the destination supernode,
       performing the CMOD operation between the source supernode and the destination supernode using code that is written in an architecture-independent high-level language if a result of a function on the dimensions is lower than a threshold value, and
       copying the source supernode from a one-dimensional data structure into a two-dimensional data structure and copying the destination supernode from a one-dimensional data structure into a two-dimensional data structure if the result of the function on the dimensions is greater than the threshold value, and
       performing the CMOD operation between the source supernode and the destination supernode using code that is written in an architecture-specific assembly code to run efficiently on a specific computer architecture;
    storing a result of the CMOD operation in a temporary vector; and
    scattering a contents of the temporary vector into a destination representation of the sparse matrix.

13. A computer readable storage medium storing instructions that when executed by a computer cause the computer to perform a method for efficiently solving a system of equations involving a sparse matrix, comprising:
    receiving the sparse matrix as part of an equation to solve;
    identifying a plurality of supernodes in the sparse matrix, each supernode comprising a set of contiguous columns having a substantially similar pattern of non-zero elements; and
    performing a column modification (CMOD) operation between a source supernode and a destination supernode from the plurality of supernodes by,
       determining dimensions of the source supernode and the destination supernode,
       performing the CMOD operation between the source supernode and the destination supernode using code that is written in an architecture-independent high-level language if a result of a function on the dimensions is lower than a threshold value, and performing the CMOD operation between the source supernode and the destination supernode using code that is written in an architecture-specific assembly code to run efficiently on a specific computer architecture if the result of the function on the dimensions is greater than the threshold value.

14. An apparatus that efficiently solves an equation involving a sparse matrix, comprising:

a receiving mechanism that is configured to receive the sparse matrix as part of an equation to solve;

an identification mechanism that identifies a plurality of supernodes in the sparse matrix, each supernode comprising a set of contiguous columns having a substantially similar pattern of non-zero elements; and a computational mechanism that is configured to perform a column modification (CMOD) operation between a source supernode and a destination supernode from the plurality of supernodes, by determining dimensions of the source supernode and the destination supernode, performing the CMOD operation between the source supernode and the destination supernode using code that is written in an architecture-independent high-level language if a result of a function on the dimensions is lower than a threshold value, and performing the CMOD operation between the source supernode and the destination supernode using code that is written in an architecture-specific assembly code to run efficiently on a specific computer architecture if the result of the function on the dimensions is greater than the threshold value.

15. The apparatus of claim 14, wherein the computational mechanism is further configured to perform a column division (CDIV) operation on the plurality of supernodes prior to performing the CMOD operation, the CDIV operation dividing each element in each column by a scalar value.

16. The apparatus of claim 14, wherein the computational mechanism is further configured to copy the source supernode into a first data structure and to copy the destination supernode into a second data structure before using the code that is written in the architecture-specific assembly code.

17. The apparatus of claim 16, wherein the source supernode and the destination supernode are originally stored in a one-dimensional data structure, and wherein the first data structure and the second data structure are two-dimensional data structures.

18. The apparatus of claim 14, wherein the dimensions of the source supernode and the destination supernode include:

a number of columns of the source supernode;

a number of columns of the destination supernode; and a number of common contiguous elements in columns to be updated in the destination supernode.

19. The apparatus of claim 18, wherein the result of the function on the dimensions is lower than the threshold value if, the number of columns of the source supernode is less than a first threshold value, the number of columns of the destination supernode is less than a second threshold value, and the number of common contiguous elements in columns to be updated in the destination supernode is less than a third threshold value.

20. The apparatus of claim 19, further comprising a threshold determining mechanism that empirically determines the first threshold value, the second threshold value and the third threshold value.

21. The apparatus of claim 18, wherein the result of the function on the dimensions is lower than the threshold value if, the number of columns of the source supernode is less than a first threshold value, or the number of columns of the destination supernode is less than a second threshold value, or the number of common contiguous elements in columns to be updated in the destination supernode is less than a third threshold value.

* * * * *